United States Patent
Zhao et al.

(10) Patent No.: US 9,485,681 B2
(45) Date of Patent: Nov. 1, 2016

(54) USER EQUIPMENT AND ACCESS NODE AND RESPECTIVE METHODS

(71) Applicant: Telefonaktiebolaget L M Ericsson (publ), Stockholm (SE)

(72) Inventors: Zhenshan Zhao, Beijing (CN); Qianxi Lu, Beijing (CN); Qingyu Miao, Beijing (CN)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 39 days.

(21) Appl. No.: 14/420,899

(22) PCT Filed: Apr. 1, 2014

(86) PCT No.: PCT/CN2014/074524
§ 371 (c)(1),
(2) Date: Feb. 10, 2015

(87) PCT Pub. No.: WO2015/149273
PCT Pub. Date: Oct. 8, 2015

(65) Prior Publication Data
US 2016/0057640 A1  Feb. 25, 2016

(51) Int. Cl.
*H04W 4/00* (2009.01)
*H04W 24/08* (2009.01)
*H04W 16/14* (2009.01)

(52) U.S. Cl.
CPC ............ *H04W 24/08* (2013.01); *H04W 16/14* (2013.01); *Y02B 60/50* (2013.01)

(58) Field of Classification Search
CPC combination set(s) only.
See application file for complete search history.

(56) References Cited

U.S. PATENT DOCUMENTS 8,634,836 B2 * 1/2014 Pani .................. H04W 24/10 370/331
8,811,522 B2 * 8/2014 Harel ................ H04B 7/0408 375/259
2013/0295958 A1 * 11/2013 Siomina .............. G01S 5/0205 455/456.1

FOREIGN PATENT DOCUMENTS

| CN | 101420268 A | 4/2009 |
|---|---|---|
| CN | 102111769 A | 6/2011 |
| CN | 102761949 A | 10/2012 |
| KR | 100882738 B1 | 2/2009 |
| WO | WO 2013/104129 | * 7/2013 |

OTHER PUBLICATIONS

International Search Report and Written Opinion for International Application No. PCT/CN2014/074524, mailed Dec. 31, 2014, 13 pages.
"3rd Generation Partnership Project; Technical Specification Group Radio Access Network; Evolved Universal Terrestrial Radio Access (E-UTRA); Requirements for support of radio resource management (Release 12)", 3GPP TS 36.133 V12.2.0, (Dec. 2013), pp. 1-815.

* cited by examiner

*Primary Examiner* — Frank Duong
(74) *Attorney, Agent, or Firm* — Nicholson De Vos Webster & Elliott LLP

(57) ABSTRACT

A user equipment (UE) for which an analog beamforming scheme is applied and a measuring method performed by the UE are provided. Also an access node (AN) and a method performed by the AN are provided. The measuring method performed by the UE comprising: transmitting, to a serving access node, a measurement request for measuring a neighboring access node that is working at a same frequency as the user equipment; receiving, from the serving access node, information related to a series of measurement time gaps; and after a delay, performing a measurement to the neighboring access node within the series of measurement time gaps.

22 Claims, 4 Drawing Sheets

USER EQUIPMENT AND ACCESS NODE AND RESPECTIVE METHODS

CROSS-REFERENCE TO RELATED APPLICATIONS

This application is a National stage of International Application No. PCT/CN2014/074524, filed Apr. 1, 2014, which is hereby incorporated by reference.

TECHNICAL FIELD

The present disclosure relates to measurement in a wireless network and in particular to measurement in a MMW (Millimeter Wave)-based wireless network.

BACKGROUND

Ultra Dense Networks, UDNs are generally regarded as the next generation communication system following the 3rd Generation Partnership Project Long Term Evolution (3GPP LTE) system. They are expected to provide data rates up to 10 Gbit/s and even higher, which might meet user requirements for increasing data traffic.

MMW is one of candidate techniques for the next generation communication system (i.e. UDN) due to its high frequencies and huge license-free bandwidth at these frequencies. Compared with technologies operating at lower frequencies, however, MMW may suffer more severe signal attenuation and higher total noise power which result in very short transmission distances. In order to solve this problem, an antenna-array beamforming technology is used which is a promising technology and can enhance intensity of signals or increase transmission distances significantly.

There are two main schemes about the antenna-array beamforming technology. One is a digital beamforming scheme, and the other is an analog beamforming scheme. With respect to both of the two beamforming schemes, weighting operations are generally performed to signals which are to be transmitted from an antenna-array of Access Node (AN) and received by antennas of an antenna-array of a UE (User Equipment), or vice versa. Different weighting operations form different beamforming patterns which thus result in different effects. The digital beamforming scheme performs weighting operations to signals in digital domain and can thus achieve an effect which looks like that signals from all direction can be received simultaneously by an antenna-array of a UE. However, the analog beamforming scheme performs weighting operations to signals in analog domain and can thus achieve an effect which looks like that signals from only one direction can be received at a certain time by the antenna-array of the UE.

In the digital beamforming scheme, since the weighting operation is done in digital domain, each antenna branch needs a dedicated Analog-to-Digital Converters (ADC). But in the analog beamforming scheme, since the weighting operation is implemented in analog domain before a common ADC, an antenna-specific ADC can be avoided. Since complexity and cost of the analog beamforming scheme are lower than the digital beamforming scheme, the analog beamforming scheme is preferably used for UEs or ANs in a MMW-based network. In the current 3GPP LTE network, however, the digital beamforming scheme is used for UEs or ANs. Since, as described above, the effect achieved by the digital beamforming scheme is different from that achieved by the analog beamforming scheme, mechanisms for UEs or ANs using the digital beamforming scheme may not work for UEs or ANs using the analog beamforming scheme.

One of the mechanisms is intra-frequency measurement performed during cell search. In the 3GPP LTE network, intra-frequency measurement refers to a situation in which a neighbouring AN which is working at the same frequency as a served UE being currently serviced by a serving AN, is detected by the served UE. Since the neighbouring AN, the serving AN and the UE work at the same frequency and the digital beamforming scheme is used by the UE, the UE can receive, in terms of actual effect, a signal from the neighbouring AN while performing data communication with the serving AN at the same time. Therefore, in the 3GPP LTE network, measurement to the neighbouring AN and data communication with the serving AN are arranged to be performed simultaneously.

With respect to UEs using the analog beamforming scheme, however, the above mechanism can not work since the UEs can receive, in terms of actual effect, signals in only one direction at a certain time. When a served UE is performing data communication with a serving AN, measurement to a neighbouring AN which is working at the same frequency as the served UE can not be performed by the served UE. Therefore, if the cell searching mechanism of the 3GPP LTE network is directly used in a MMW-based network, those neighbouring ANs which are working at the same frequency as the served UE can not be detected.

Generally speaking, a system signal, such as a reference signal or a synchronization signal should be periodically transmitted by an AN to its served UEs, so that the served UEs can know information about the AN. Furthermore, in UDN networks, it is more possible for ANs to use longer system signal period in order to save power consumption. Therefore, a UE will take much more time to capture a system signal of a neighbouring AN if it starts measurement to the neighbouring AN randomly.

SUMMARY

The object is to obviate at least some of the problems outlined above. In particular, it is an object to provide a UE for which an analog beamforming scheme is applied and a measuring method performed by the UE. It is further an object to provide an AN and a method performed by the AN. These objects and others may be obtained by providing a UE and an AN respectively and a respective method performed by the UE and the AN according to the independent claims attached below.

According to an aspect there is provided a measuring method performed by a user equipment for which an analog beamforming scheme is applied. The method comprises transmitting, to a serving access node, a measurement request for measuring a neighbouring access node which is working at the same frequency as the user equipment; receiving from the serving access node, information related to a series of measurement time gaps; and after a delay, performing measurement to the neighbouring access node within the series of measurement time gaps.

Within each of the series of measurement time gaps, the performing step comprises suspending data communication with the serving access node; adjusting a beamforming pattern of the user equipment; and detecting a system signal of the neighbouring access node.

The method further comprises after the detecting step, re-adjusting the beamforming pattern of the user equipment; and restoring the data communication with the serving access node.

The information comprises length of the delay, a period of the series of measurement time gaps, and length of each measurement time gap.

The period of the series of measurement time gaps is a multiple of a period of a system signal of the neighbouring access node, and the length of each measurement time gap is equal to a sum of an offset and length of a transmitting time gap within which the system signal of the neighbouring access node is transmitted.

The method further comprises after the receiving step, after another delay, performing measurement to another neighbouring access node within another series of measurement time gaps, wherein the another neighbouring access node is working at the same frequency as the user equipment, and information related to the another series of measurement time gaps is included in the information related to the series of measurement time gaps.

The delay is different from the another delay and the series of measurement time gaps do not overlap the another series of measurement time gaps.

According to yet an aspect a method performed by an access node is provided. The method comprises determining information related to a series of measurement time gaps in response to receiving from a served user equipment a measurement request for measuring a neighbouring access node which is working at the same frequency as the user equipment; transmitting the information to the served user equipment.

The method further comprises after the transmitting step, suspending data communication with the served user equipment.

The method further comprises before the determining step, obtaining the system signal of the neighbouring access node from the neighbouring access node, wherein the information is determined at least based on the system signal of the neighbouring access node.

The information comprises: a delay, a period of the series of measurement time gaps, length of each measurement time gap.

The method further comprises determining information related to another series of measurement time gaps in response to receiving from the served user equipment a measurement request for measuring another neighbouring access node which is working at the same frequency as the user equipment, and the information related to the another series of measurement time gaps is included in the information related to the series of measurement time gaps.

The series of measurement time gaps do not overlap the another series of measurement time gaps.

If a transmitting time gap of the system signal of the neighbouring access node does not overlap that of the system signal of the another neighbouring access node, a delay corresponding to the neighbouring access node is different from that corresponding to the another neighbouring access node, and a period of the series of measurement time gaps is a multiple of a period of the system signal of the neighbouring access node and a period of the another series of measurement time gaps is a multiple of a period of the system signal of the another neighbouring access node.

If a transmitting time gap of the system signal of the neighbouring access node overlaps that of the system signal of the another neighbouring access node, a delay corresponding to the neighbouring access node is different from that corresponding to the another neighbouring access node, and a period of the series of measurement time gaps is at least twice as long as a period of the system signal of the neighbouring access node, and a period of the another series of measurement time gaps is at least twice as long as a period of the system signal of the another neighbouring access node.

According to still an aspect a user equipment is provided for which an analog beamforming scheme is applied. The user equipment is adapted to transmit, to a serving access node, a measurement request for measuring a neighbouring access node which is working at the same frequency as the user equipment; receive, from the serving access node, information related to a series of measurement time gaps; and after a delay, perform measurement to the neighbouring access node within the series of measurement time gaps.

Within each of the series of measurement time gaps, the performing step comprises suspending data communication with the serving access node; adjusting a beamforming pattern of the user equipment; detecting a system signal of the neighbouring access node.

The user equipment is further adapted to re-adjust the beamforming pattern of the user equipment; and restore the data communication with the serving access node.

The user equipment is further adapted to after the receiving step, after another delay, perform measurement to another neighbouring access node within another series of measurement time gaps, wherein the another neighbouring access node is working at the same frequency as the user equipment, and information related to the another series of measurement time gaps is included in the information related to the series of measurement time gaps.

According to another aspect an access node is provided. The access node is adapted to determine information related to a series of measurement time gaps in response to receiving from a served user equipment a measurement request for measuring a neighbouring access node which is working at the same frequency as the user equipment; and transmit the information to the served user equipment.

The access node is further adapted to after the transmitting step, suspend data communication with the served user equipment.

The access node is further adapted to before the determining step, obtain the system signal of the neighbouring access node from the neighbouring access node, wherein the information is determined based on the system signals of the neighbouring access node.

The information comprises a delay, a period of the series of measurement time gaps, length of each measurement time gap.

The access node is further adapted to determine information related to another series of measurement time gaps in response to receiving from the served user equipment a measurement request for measuring another neighbouring access node which is working at the same frequency as the user equipment; and transmit, to the served user equipment, the information related to the another series of measurement time gaps.

According to yet an aspect a user equipment is provided for which an analog beamforming scheme is applied. The user equipment comprises a processor and a memory. The memory comprises instructions which when executed by the processor causes the user equipment to transmit, to a serving access node, a measurement request for measuring a neighbouring access node which is working at the same frequency as the user equipment; receive, from the serving access node, information related to a series of measurement time gaps; and after a delay, perform measurement to the neighbouring access node within the series of measurement time gaps.

Within each of the series of measurement time gaps, the performing step comprises: suspending data communication with the serving access node; adjusting a beamforming pattern of the user equipment; and detecting a system signal of the neighbouring access node.

The memory further comprises instructions, which when executed by the processor causes the user equipment to re-adjust the beamforming pattern of the user equipment; and restore the data communication with the serving access node.

The memory further comprises instructions, which when executed by the processor causes the user equipment to after the receiving step, after another delay, perform measurement to another neighbouring access node within another series of measurement time gaps, wherein the another neighbouring access node is working at the same frequency as the user equipment, and information related to the another series of measurement time gaps is included in the information related to the series of measurement time gaps.

According to still an aspect an access node is provided. The access node comprises a processor and a memory. The memory comprises instructions which when executed by the processor causes the access node to determine information related to a series of measurement time gaps in response to receiving from a served user equipment a measurement request for measuring a neighbouring access node which is working at the same frequency as the user equipment; and transmit the information to the served user equipment.

The memory further comprises instructions, which when executed by the processor causes the access node to after the transmitting step, suspend data communication with the served user equipment.

The memory further comprises instructions, which when executed by the processor causes the access node to before the determining step, obtain the system signal of the neighbouring access node from the neighbouring access node, wherein the information is determined at least based on the system signal of the neighbouring access node.

The information comprises a delay, a period of the series of measurement time gaps, length of each measurement time gap.

The memory further comprises instructions, which when executed by the processor causes the access node to determine information related to another series of measurement time gaps in response to receiving from the served user equipment a measurement request for measuring another neighbouring access node which is working at the same frequency as the user equipment; and transmit, to the served user equipment, the information related to the another series of measurement time gaps.

According to still an aspect a user equipment is provided for which an analog beamforming scheme is applied. The user equipment comprises a transmitting unit for transmitting, to a serving access node, a measurement request for measuring a neighbouring access node which is working at the same frequency as the user equipment; a receiving unit for receiving, from the serving access node, information related to a series of measurement time gaps; and a performing unit for after a delay, performing measurement to the neighbouring access node within the series of measurement time gaps.

According to another aspect an access node is provided. The access node comprises a determining unit for determining information related to a series of measurement time gaps in response to receiving from a served user equipment a measurement request for measuring a neighbouring access node which is working at the same frequency as the user equipment; and a transmitting unit for transmitting the information to the served user equipment.

According to yet an aspect a computer program is provided. The computer program comprises instructions which, when executed on at least one processor, cause the at least one processor to carry out the method according to the method performed by the UE.

According to still an aspect a computer program is provided. The computer program comprises instructions which, when executed on at least one processor, cause the at least one processor to carry out the method according to the method performed by the AN.

The method performed by a UE and the method performed by an AN as well as the UE and the AN may have several advantages. In a wireless network, especially a MMW-based network, through the AN providing information about measurement time gap to the UE, the UE may take a little time to perform measurement, thus increasing time efficiency and decreasing power consumption. Furthermore, through suspending data communication between the UE and the AN during measurement, data lost can be reduced.

BRIEF DESCRIPTION OF DRAWINGS

Embodiments will now be described in more detail in relation to the accompanying drawings, in which.

DETAILED DESCRIPTION

Briefly described, a UE for which an analog beamforming scheme is applied and a measuring method performed by the UE are provided. Also an AN and a method performed by the AN are provided. Hereinafter, except otherwise specified, a UE refers to the one for which an analog beamforming scheme is applied. A serving AN refers to the one which is providing services to its served UE. A neighbouring AN refers to the one which is working at the same frequency as a served UE currently serviced by a serving AN. A measurement gap refers to a period of time within which a served UE will perform measurement to a neighbouring AN. A system signal refers to the one which will be periodically transmitted by a serving AN or a neighbouring AN. It can be, for example, a reference signal or a synchronization signal which carries information about the serving AN or the neighbouring AN. A transmitting time gap refers to a period of time during which a system signal is transmitted. In addition, data communication specifically refers to data transmitting or receiving, usually not including control signalling transmitting or receiving. The term "delay" used herein generally refers to a period of time taken by the UE to wait for performing measurement after receiving information related to measurement time gap from a serving AN. It is determined by the serving AN after receiving a measurement request from the UE. If there are more than one neighbouring ANs, delays corresponding to the more than one neighbouring ANs respectively are determined by the serving AN and all of their starting times are based on one time point at which the UE receives information related to measurement time gap from the serving AN.

Embodiments of a measuring method 100 performed by a UE for which an analog beamforming scheme is applied will now be described with reference to FIG. 1.

Figure 1:
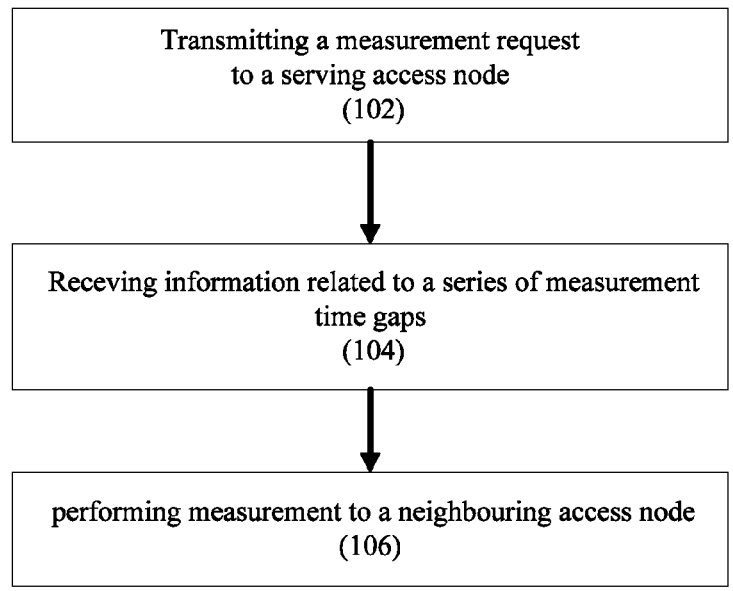
FIG. 1 is a flowchart of a measuring method performed by a UE for which an analog beamforming scheme is applied according to an exemplifying embodiment.

FIG. 1 illustrates the method 100 comprising transmitting 102, to a serving access node, a measurement request for measuring a neighbouring access node which is working at the same frequency as the user equipment; receiving 104, from the serving access node, information related to a series of measurement time gaps; and after a delay, performing 106 measurement to the neighbouring access node within the series of measurement time gaps.

There are many conditions which can trigger measurement to a neighbouring AN. As an example, if a UE detects a weak signal received from its serving AN and one aspect of the signal is less than a predetermined threshold for a predefined period of time, the UE will trigger measurement to a neighbouring AN in order to be serviced by an AN with better signal quality. At this case, the transmitting step 102 can be done initiatively by the UE. Herein, the measurement request is specifically directed to measurement to a neighbouring AN which is working at the same frequency as the UE, rather than a neighbouring AN which is not working at the same frequency as the UE.

The measurement request can play a lot of roles between the UE and its serving AN herein. As an example, the UE can use the measurement request to notify the serving AN that measurement will to be performed, so that the serving AN can duly suspend data communication with the UE, thus avoiding data lost. As another example, the UE can use the measurement request to obtain useful information from its serving AN, such as information about a series of measurement time gaps, so that the UE can perform measurement effectively.

After the transmitting step 102, the UE will wait for a response from the serving AN. When the serving AN receives the measurement request from the UE, it will determine information related to a series of measurement time gaps and transmit the information to the UE, which will be discussed in detail hereinafter. When the serving AN transmits the information, the UE will perform the receiving step 104, thus obtaining the information related to the series of measurement time gaps.

When the information related to the series of measurement time gaps is received, the performing step 106 can be done by the UE. At this step, the UE will perform measurement within the series of measurement time gaps which are based on the information provided by the serving AN, rather than randomly. In particular, the serving AN can notify the served UE of exact time when a system signal of a neighbouring AN will be transmitted. Then, the served UE can use the exact time to perform measurement. Based on this, time taken by the UE to wait for a system signal of a neighbouring AN can be reduced. Therefore, it is highly effective in time.

In particular, within each of the series of measurement time gaps, the UE should first suspend data communication with the serving AN, avoiding data lost during measurement. This is because data from or to the serving AN can not be, in terms of actual effect, received or transmitted by the UE (in fact, the UE can receive the signals in physics from a lot of directions. Just because the UE uses the analog beamforming scheme, the UE can not actually process signals simultaneously came from such as the serving AN and the neighbouring AN. Therefore, in terms of actual effect, it seems that the UE can not receive signals simultaneously from a lot of directions, or not transmit signals in the directions), once the current beamforming pattern of the UE is adjusted (in fact, in this operation, a set of weight values corresponding to the current beamforming pattern of the UE are adjusted, so that another beamforming pattern of the UE corresponding to another set of weight values is generated. Both of the set of weight values and the another set of weight values are used for the weighting operation done by the antenna-array of the UE). Those skilled in the art can design a lot of methods to do this operation. As an example, the UE can record the breakpoint and save information which is helpful for restoring the data communication later.

Next, the UE will adjust the current (for example, the first) beamforming pattern to a second beamforming pattern in order to receive a system signal of the neighbouring AN. In an embodiment, time taken by the UE to adjust the beamforming pattern can be considered in determining the series of measurement time gaps. Details about this will be discussed later.

Once the adjustment is done, the UE can receive or detect the system signal of the neighbouring AN.

After the system signal is received or detected, i.e. after the end of each measurement time gap, the UE preferably goes back to the serving AN from the detected neighbouring AN. In particular, the UE may re-adjust its beamforming pattern (i.e. re-adjust the second beamforming pattern to the first beamforming pattern) to go back to the serving AN. Once the UE is serviced by the serving AN, it may restore the previous data communication with the serving AN. Then, the UE will wait for the next measurement time gap to perform measurement. In an embodiment, it may be enough for the UE to measure the system signal of the neighbouring AN only once. This may occur in a situation in which the signal quality of the neighbouring AN is so good that the UE can perform cell switching, for example. At this case, there is no need to measure the system signal of the neighbouring AN again. In another embodiment, measurement may be performed twice or more by the UE.

In an embodiment, there may be another neighbouring AN which is working at the same frequency as the UE. At this case, after the receiving step 104, the UE also perform measurement to the another neighbouring AN. In particular, the UE will perform measurement to the another neighbouring AN within another series of measurement time gaps also provided by the serving AN. In an embodiment, the information about the series of measurement time gaps (which is corresponding to the neighbouring AN) and the another series of measurement gaps (which is corresponding to the another neighbouring AN) may be provided in the same signal. In an alternative embodiment, they can be provided in different signals. It should be noted that the another series of measurement time gaps can not overlap the series of measurement time gaps since the UE uses the analog beamforming scheme. In particular, if the another series of measurement time gaps overlap the series of measurement time gaps partly or completely, the system signal of one of the neighbouring AN and the another neighbouring AN can not be detected as described above. Therefore, when receiving the information about measurement time gaps of the neighbouring AN and the another neighbouring AN, the UE will perform measurement to the neighbouring AN and the another neighbouring AN respectively after different delays. The way in which the delays are determined will be discussed hereinafter.

In an embodiment, if there are much more other neighbouring ANs which are working at the same frequency as the UE, measurement to the more other neighbouring ANs will be performed according to the above-described principle.

According to the disclosure, information related to a series of measurement time gaps may comprise length of a delay, a period of the series of measurement time gaps, and length of each measurement time gap which are determined by the serving AN. By means of such information, the UE can know when to perform measurement, thus avoiding time waste which results from random measurement. With respect to the information, more details will provided below.

Embodiments herein also relate to a method performed by an AN according to an exemplifying embodiment. Such a method will now be described with reference to FIG. 2.

Figure 2:
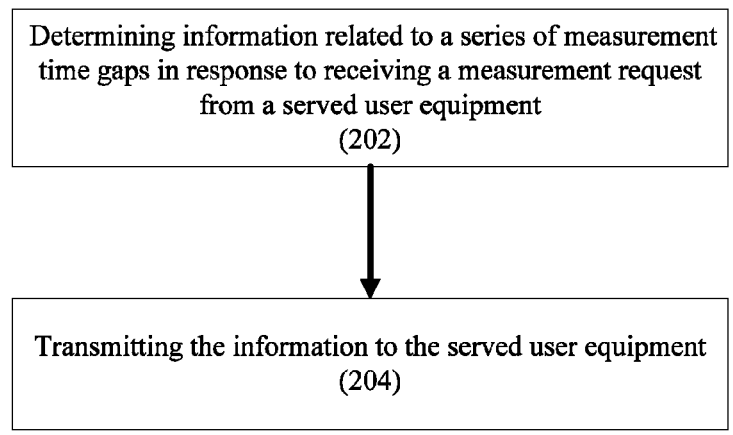
FIG. 2 is a flowchart of a method performed by an AN according to an exemplifying embodiment.

FIG. 2 is a flowchart of a method 200 performed by an AN according to an exemplifying embodiment. FIG. 2 illustrates the method 200 comprising determining 202 information related to a series of measurement time gaps in response to receiving from a served user equipment a measurement request for measuring a neighbouring access node which is working at the same frequency as the user equipment; and transmitting 204 the information to the served user equipment.

As shown in FIG. 2, at step 202, after receiving, from a served user equipment, a measurement request for measuring a neighbouring AN which is working at the same frequency as the user equipment, the AN may know that its served UE may need to perform measurement to a neighbouring AN, in order to perform for example cell switching. At this time, the AN will determine information related to a series of measurement time gaps to cause its served UE perform measurement within the series of measurement time gaps, thus increasing time efficiency and decreasing power consumption.

In order to determine the series of measurement time gaps, the AN may need to know information about a system signal of a neighbouring AN. Therefore, the AN will need to obtain the information about the system signal of the neighbouring AN. In an embodiment, after receiving the measurement request from its served UE, the AN may first communicate with the neighbouring AN to obtain the system signal of the neighbouring AN, and then determine the information related to a series of measurement time gaps. In another embodiment, the AN may communicate with the neighbouring AN to obtain the information about the system signal of the neighbouring AN and save it in advance. At this case, the AN can use the prestored information to determine the information related to a series of measurement time gaps after receiving the measurement request.

Figure 9:
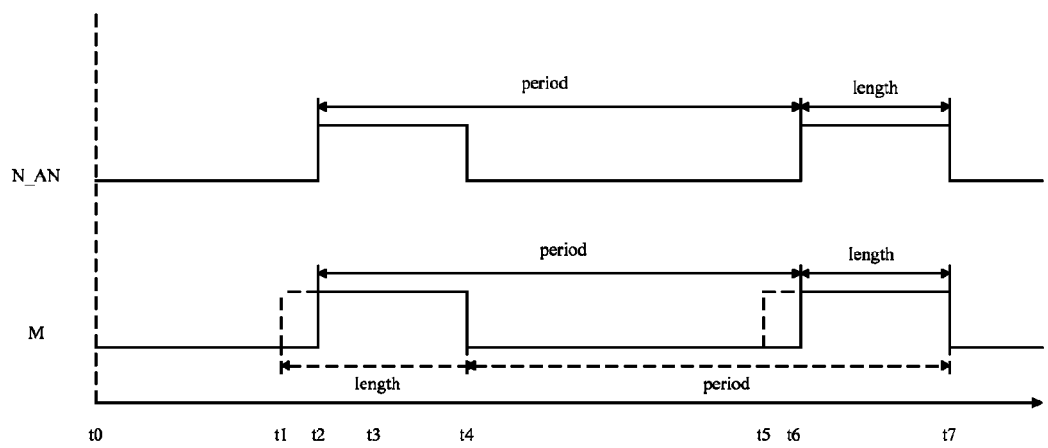
FIG. 9 is a time diagram schematically illustrating relations between a system signal of a neighbouring AN, and a measurement gap.

Now reference will be made to FIG. 9 to schematically explain how to determine the information related to a series of measurement time gaps. FIG. 9 is a time diagram schematically illustrating relationship between a system signal of a neighbouring AN and a measurement gap for the neighbouring AN.

In particular, the information related to a series of measurement time gaps may comprise a period of the series of measurement time gaps, length of each measurement time gap and a delay which will be undergone by the served UE after transmitting a measurement request and before performing measurement. The information related to a series of measurement time gaps may be determined based on system signals of the AN and the neighbouring AN. Since the period of a system signal of the neighbouring AN and the transmitting time gap of the system signal of the neighbouring AN could be obtained directly from the neighbouring AN, the most important thing is to determine the delay. Once the delay is determined, other information in the information related to the series of measurement time gaps can be determined accordingly.

First consider a situation in which one neighbouring AN exists.

In order to determine the information related to the series of measurement time gaps, the serving AN should first know time points at which system signals of the neighbouring AN will be transmitted. As an example, the serving AN can directly obtain an absolute time point at which a system signal of the neighbouring AN will be transmitted, a period of the system signal of the neighbouring AN and length of the transmitting time gap of the system signal of the neighbouring AN by communicating with the neighbouring AN via a dedicated interface. In particular, for example, the serving AN can obtain absolute time point t2 or absolute time point t6 shown in FIG. 9 from the neighbouring AN. Since the serving AN may also know the period of the system signal of the neighbouring AN, it may know all time points at which system signals of the neighbouring AN will be transmitted. As another example, if the period of the system signal of the neighbouring AN is equal to that of the system signal of the serving AN, the serving AN can obtain timing difference between the system signal of the neighbouring AN and the system signal of the serving AN along with the period of the system signal of the neighbouring AN and length of the transmitting time gap of the system signal of the neighbouring AN. The time difference refers to relative time. Assuming that within a certain period, the system signal of the serving AN is transmitted at time point t1 and the system signal of the neighbouring AN is transmitted at time point t2, the time difference is t2−t1. In such a case, if a time point t3 at which the system signal of the serving AN was transmitted is known, a time point t4 at which the system signal of the neighbouring AN will be transmitted immediately can also be known based on the above time difference, i.e. t4=t3+(t2−t1).

That is to say, the information related to the series of measurement time gaps is determined at least based on the system signal of the neighbouring access node, i.e. the serving AN can only use information about the system signal of the neighbouring AN to determine the information related to the series of measurement time gaps, and the serving AN can also use information about both of system signals of the serving AN and the neighbouring AN to determine it.

However, it should be understood that any other method can be used by those skilled in the art to obtain the information related to series of measurement time gaps from the above teachings.

Further referring to FIG. 9. As shown in FIG. 9, assuming N_AN represents the neighbouring AN; M represents a measurement time gap; the serving AN receives the measurement request at time point t0; and a period of time from time points t2 to t4 or time points t6 to t7 represents a transmitting time gap of the N_AN within which a system signal of the N_AN will be transmitted. However, it should be noted by those skilled in the art that the time point at which the serving AN receives the measurement request is used in these embodiments as the starting time of the delay, only for simplifying description. If time taken by the serving AN to determine information related to measurement time gap and time taken by the serving AN to transmit the information to the served UE are ignored, delays computed by means of the following methods are actual delays which will be undergone by the served UE to wait for performing measurement. If they are not ignored, those skilled in the art may accordingly adjust the delays computed by the means of the following methods to get the actual delays for the served UE.

Return back to FIG. 9 now. The serving AN may know the nearest system signal of the neighbouring AN will be transmitted at time point t2 according to the above-described method when it receives the measurement request. At this case, the delay which will be undergone by the served UE before performing measurement may be determined as t2−t0.

In addition, in an example as shown in FIG. 9, the period of the measurement gap can be determined as being equal to that of the transmitting time gap of the N_AN, for example, a period of time from time point t6 to time point t2. In an alternative embodiment, in order to avoid frequent switching of the UE between the serving AN and the neighbouring AN, the period of the measurement gap can be determined as being twice or more times as long as that of the transmitting time gap of the N_AN. That is to say, the period of the measurement time gap can be a multiple of the period of the system signal of the neighbouring access node.

Further, in an example as shown in FIG. 9, length of the measurement gap of the serving AN can be determined as being equal to that of the transmitting time gap of the N_AN. However, in an alternative embodiment, time taken by the UE to adjust its beamforming pattern will be considered. At this case, as shown by the dashed lines in FIG. 9, length of the measurement gap can be determined as being a sum of an offset and length of the transmitting time gap of the N_AN. As an example, the offset may be equal to the time taken by the UE to adjust its beamforming pattern. However, many other factors, such as time spent on the transmission path by a system signal, could be considered to compute the offset.

In such a case, as shown by FIG. 9, the delay may be determined as t1−t0. Use of the offset can guarantee a system signal of the neighbouring AN can be fully received by the served UE without data lost.

Based on the above teachings, many other factors may be considered in measurement time gap designs, such as time spent on the transmission path, and so on, in order to increase precision of the measurement.

Next, consider a situation in which at least two neighbouring ANs exist. At this case, Since the UE can not detect signals from different ANs in terms of actual effect at the same time, the most import thing is that a series of measurement time gaps corresponding to a neighbouring AN can not be designed as overlapping another series of measurement time gaps corresponding to another neighbouring AN, which can be done for example, by determining whether the transmitting time gap of a system signal of the neighbouring AN overlaps that of a system signal of the another neighbouring AN.

If the transmitting time gap of the system signal of the neighbouring AN does not overlap that of the system signal of the another neighbouring AN, a delay corresponding to a neighbouring access node can be determined as being different from that corresponding to another neighbouring access node first, and a period of a series of measurement time gaps may be determined as being a multiple of a period of the system signal of the neighbouring access node and a period of the another series of measurement time gaps may be determined as being a multiple of a period of the system signal of the another neighbouring access node.

Moreover, if the transmitting time gap of the system signal of the neighbouring access node overlaps that of the system signal of the another neighbouring access node, the delay corresponding to the neighbouring access node can be determined as being different from that corresponding to the another neighbouring access node, and a period of the series of measurement time gaps may be determined as being at least twice as long as a period of the system signal of the neighbouring access node, and a period of the another series of measurement time gaps may be determined as being at least twice as long as a period of the system signal of the another neighbouring access node. For example, assuming the transmitting time gaps of the system signal are divided into odd number transmitting gaps and even number transmitting gaps. In such a case, if a transmitting time gap of a system signal of a neighbouring AN completely or partially overlaps that of a system signal of another neighbouring AN and a period of the system signal of the neighbouring AN is equal to that of the system signal of the another neighbouring AN, periods of both of measurement time gaps corresponding to the neighbouring AN and the another neighbouring AN respectively can be set as being twice as long as the period of the system signal of one of the neighbouring AN and the another neighbouring AN, and a delay corresponding to the neighbouring AN can be set to reach an odd number transmitting gap and another delay corresponding to the another neighbouring AN can be set to reach a even number transmitting gap. By doing so, overlapping between the measurement gaps corresponding to the neighbouring AN and the another neighbouring AN respectively may be avoided.

Therefore, overlapping between the series of measurement time gaps and the another series of measurement time gaps can be overcome for example by increasing the period thereof and adjusting the delays.

Return back to FIG. 2 now, after the determining step 202, at step 204, the information related to a measurement time gap may be transmitted to the served user equipment. Those skilled in the art can design a lot of ways to transmit the information, such as via a broadcast signal or a dedicated signal.

In an embodiment, if the serving AN is performing data communication with the UE, the method further comprises suspending the data communication with the UE after the transmitting step 204. In such a case, the serving AN can use the same method as the UE to suspend the data communication, which is described above.

Moreover, with respect to the method as shown in FIG. 2, if there is another neighbouring AN, the method further comprises determining information related to another series of measurement time gaps in response to receiving from the served user equipment the measurement request for measuring another neighbouring access node which is working at the same frequency as the user equipment. Preferably, the measurement request for measuring different neighbouring access nodes is included in the same message. It is preferred that the information related to measurement time gaps for neighbouring access nodes is included in the same message. For example, the information related to the another series of measurement time gaps is included in the information related to the series of measurement time gaps.

Embodiments herein also relate to a UE for which an analog beamforming scheme is applied according to an exemplifying embodiment. The UE has the same objects, technical features as the method performed by the UE. The UE will hence only be described in brief in order to avoid unnecessary repetition.

Figure 3:
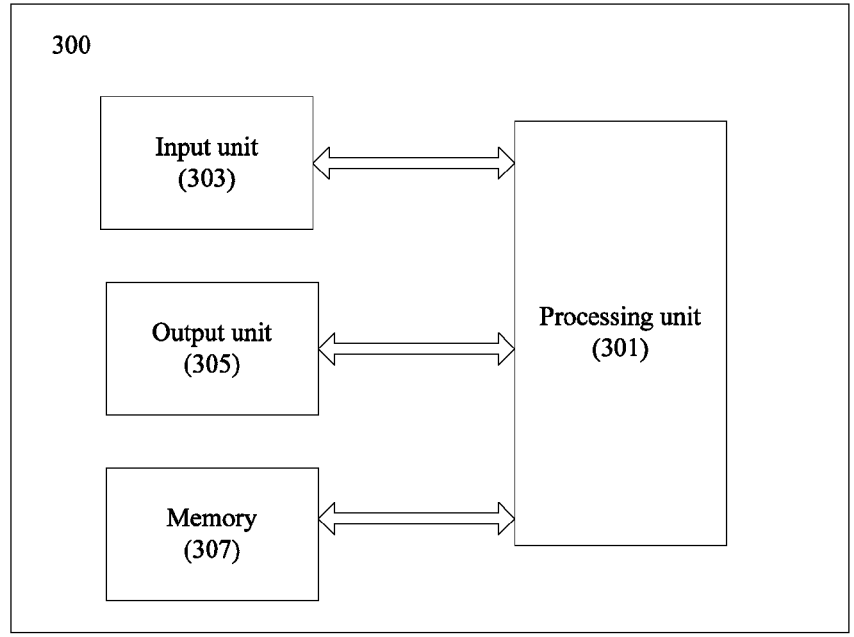
FIG. 3 is a block diagram of a UE for which an analog beamforming scheme is applied according to an exemplifying embodiment.

FIG. 3 is a block diagram of a UE for which an analog beamforming scheme is applied according to an exemplifying embodiment.

FIG. 3 illustrates a UE 300. The UE 300 comprises a processing unit 301 adapted to, after the receiving step, after a delay, perform measurement to the neighbouring access node within the series of measurement time gaps; an input unit 303 adapted to receive, from the serving access node, information related to a series of measurement time gaps; and an output unit 305 adapted to transmit, to a serving access node, a measurement request for measuring a neighbouring access node which is working at the same frequency as the user equipment.

Within each of the series of measurement time gaps, the performing step comprises: suspending data communication with the serving access node; adjusting a beamforming pattern of the user equipment; and detecting a system signal of the neighbouring access node.

The processing unit 301 can be further adapted to after the detecting step, re-adjust the beamforming pattern of the user equipment; and restore the data communication with the serving access node.

The processing unit 301 can be further adapted to after the receiving step, after another delay, perform measurement to another neighbouring access node within another series of measurement time gaps, wherein the another neighbouring access node is working at the same frequency as the user equipment, and information related to the another series of measurement time gaps is included in the information related to the series of measurement time gaps.

The processing unit 301 may be for example a single processor or multiple processors. The processing unit 301 may be a single unit or a plurality of units to perform different actions of procedures described herein. The input unit 303 and the output unit 305 may be arranged as an integrated entity (for example, an antenna) or separate entities (for example, a transmitter or a receiver).

Furthermore, the UE 300 may comprise a memory 307 for storing information. The memory 307 may be a volatile or non-volatile memory, e.g. an EEPROM (Electrically Erasable Programmable Read-Only Memory), a flash memory and/or a hard drive, and so on.

The UE 300 may have the same advantages as the method performed by the UE 300.

Embodiments herein also relate to an AN according to an exemplifying embodiment. The AN has the same objects, technical features as the method performed by the AN. The AN will hence only be described in brief in order to avoid unnecessary repetition.

Figure 4:
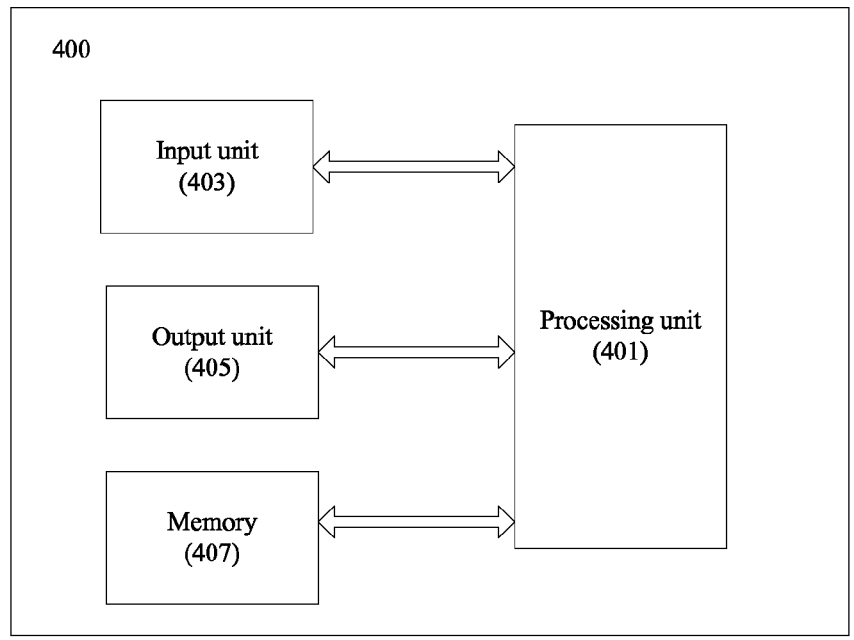
FIG. 4 is a block diagram of an AN according to an exemplifying embodiment.

FIG. 4 is a block diagram of an AN according to an exemplifying embodiment.

FIG. 4 illustrates an AN 400. The UE 400 comprises a processing unit 401 adapted to determine information related to a series of measurement time gaps in response to receiving from a served user equipment a measurement request for measuring a neighbouring access node which is working at the same frequency as the user equipment; an input unit 403 adapted to receiving the measurement request from the served user equipment; and an output unit 405 adapted to transmit the information to the served user equipment.

In addition, the processing unit 401 can be further adapted to after the transmitting step, suspend data communication with the served user equipment.

In addition, the processing unit 401 can be further adapted to before the determining step, obtain the system signal of the neighbouring access node from the neighbouring access node, wherein the information related to the series of measurement time gaps is at least determined based on the system signal of the neighbouring access node.

In addition, the processing unit 401 can be further adapted to determine information related to another series of measurement time gaps in response to receiving from the served user equipment a measurement request for measuring another neighbouring access node which is working at the same frequency as the user equipment. The output unit 405 can be further adapted to transmit, to the served user equipment, the information related to the another series of measurement time gaps.

In an embodiment, the information related to the series of measurement time gaps comprises a delay, a period of the series of measurement time gaps, and length of each measurement time gap.

The processing unit 401 may be for example a single processor or multiple processors. The processing unit 401 may be a single unit or a plurality of units to perform different actions of procedures described herein. The input unit 403 and the output unit 405 may be arranged as an integrated entity (for example, an antenna) or separate entities (for example, a transmitter or a receiver).

Furthermore, the AN 400 may comprise a memory 407 for storing information. The memory 407 may be a volatile or non-volatile memory, e.g. an EEPROM (Electrically Erasable Programmable Read-Only Memory), a flash memory and/or a hard drive, and so on.

The AN may have the same advantages as the method performed by the AN.

Embodiments herein also relate to a UE for which an analog beamforming scheme is applied according to an exemplifying embodiment. The UE has the same objects, technical features as the method performed by the UE. The UE will hence only be described in brief in order to avoid unnecessary repetition.

Figure 5:
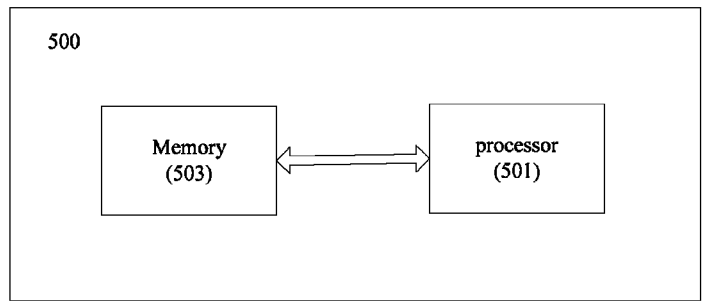
FIG. 5 is a block diagram of a UE for which an analog beamforming scheme is applied according to an exemplifying embodiment.

FIG. 5 is a block diagram of a UE for which an analog beamforming scheme is applied according to an exemplifying embodiment.

FIG. 5 illustrates a UE 500 comprises a processor 501 and memory 503. The memory comprises instructions which when executed by the processor 501 causes the UE 500 to transmit, to a serving access node, a measurement request for measuring a neighbouring access node which is working at the same frequency as the user equipment; receive, from the serving access node, information related to a series of measurement time gaps; and after the receiving step, after a delay, perform measurement to the neighbouring access node within the series of measurement time gaps.

Within each of the series of measurement time gaps, the performing step comprises: suspending data communication with the serving access node; adjusting a beamforming pattern of the user equipment; and detecting a system signal of the neighbouring access node.

In an embodiment, the memory (503) further comprises instructions, which when executed by the processor (501) causes the user equipment (500) to: after the detecting step, re-adjust the beamforming pattern of the user equipment; and restore the data communication with the serving access node.

In an embodiment, the memory (503) further comprises instructions, which when executed by the processor (501) causes the user equipment (500) to: after the receiving step, after another delay, perform measurement to another neighbouring access node within another series of measurement time gaps, wherein the another neighbouring access node is working at the same frequency as the user equipment, and information related to the another series of measurement time gaps is included in the information related to the series of measurement time gaps.

The UE may have the same advantages as the method performed by the UE.

Embodiments herein also relate to an AN according to an exemplifying embodiment. The AN has the same objects, technical features as the method performed by the AN. The AN will hence only be described in brief in order to avoid unnecessary repetition.

Figure 6:
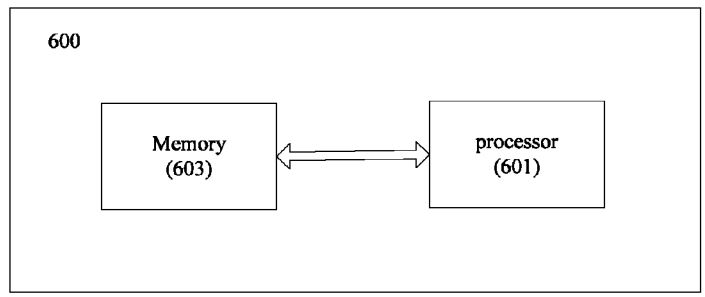
FIG. 6 is a block diagram of an AN according to an exemplifying embodiment.

FIG. 6 is a block diagram of an AN according to an exemplifying embodiment.

FIG. 6 illustrates the AN 600 comprising a processor 601 and memory 603. the memory 603 comprising instructions which when executed by the processor 601 causes the access node 600 to: determine information related to a series of measurement time gaps in response to receiving from a served user equipment a measurement request for measuring a neighbouring access node which is working at the same frequency as the user equipment; and transmit the information to the served user equipment.

In an embodiment, the memory 603 further comprises instructions, which when executed by the processor 601 causes the access node 600 to: after the transmitting step, suspend data communication with the served user equipment.

In an embodiment, the memory 603 further comprises instructions, which when executed by the processor 601 causes the access node 600 to: before the determining step, obtain the system signal of the neighbouring access node from the neighbouring access node, wherein the information is determined at least based on the system signal of the neighbouring access node.

In an embodiment, the information the series of measurement time gaps comprises a delay, a period of the series of measurement time gaps, length of each measurement time gap.

In an embodiment, the memory 603 further comprises instructions, which when executed by the processor 601 causes the access node 600 to: determine information related to another series of measurement time gaps in response to receiving from the served user equipment a measurement request for measuring another neighbouring access node which is working at the same frequency as the user equipment; and transmit, to the served user equipment, the information related to the another series of measurement time gaps.

The AN may have the same advantages as the method performed by the AN.

Embodiments herein also relate to a UE for which an analog beamforming scheme is applied according to an exemplifying embodiment. The UE has the same objects, technical features as the method performed by the UE. The UE will hence only be described in brief in order to avoid unnecessary repetition.

Figure 7:
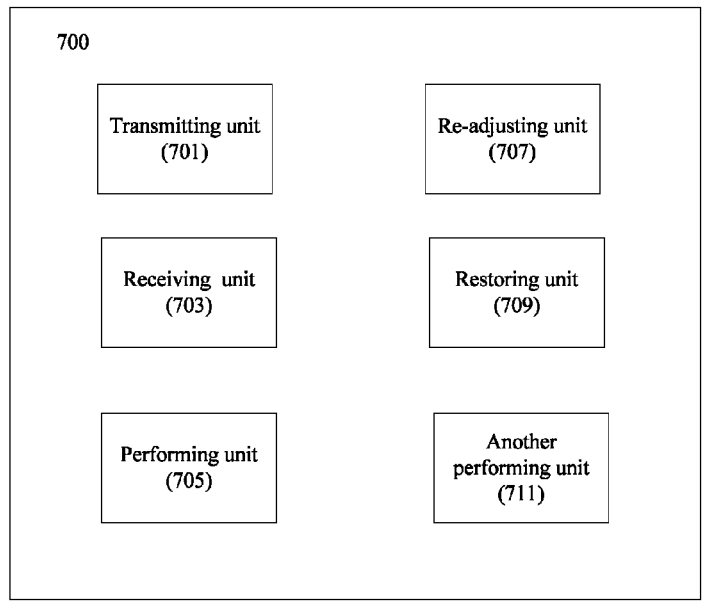
FIG. 7 is a block diagram of a UE for which an analog beamforming scheme is applied according to an exemplifying embodiment.

FIG. 7 is a block diagram of a UE for which an analog beamforming scheme is applied according to an exemplifying embodiment.

FIG. 7 illustrates the UE 700 comprising a transmitting unit 701 for transmitting, to a serving access node, a measurement request for measuring a neighbouring access node which is working at the same frequency as the user equipment; a receiving unit 703 for receiving, from the serving access node, information related to a series of measurement time gaps; and a performing unit 705 for after the receiving step, after a delay, performing measurement to the neighbouring access node within the series of measurement time gaps.

In an embodiment, within each of the series of measurement time gaps, the performing step comprises: suspending data communication with the serving access node; adjusting a beamforming pattern of the user equipment; and detecting a system signal of the neighbouring access node.

In an embodiment, the UE further comprises a re-adjusting unit 707 for re-adjusting the beamforming pattern of the user equipment; and a restoring unit 709 for restoring the data communication with the serving access node.

In an embodiment, the UE further comprises another performing unit 711 for after the receiving step, after another delay, performing measurement to another neighbouring access node within another series of measurement time gaps, wherein the another neighbouring access node is working at the same frequency as the user equipment, and information related to the another series of measurement time gaps is included in the information related to the series of measurement time gaps.

The UE may have the same advantages as the method performed by the UE.

It should be noted that FIG. 7 merely illustrates various functional units in the UE 700 in a logical sense. The functions in practice may be implemented using any suitable software and hardware means/circuits etc. Thus, the embodiments are generally not limited to the shown structures of the UE 700 and the functional units.

Embodiments herein also relate to an AN according to an exemplifying embodiment. The AN has the same objects, technical features as the method performed by the AN. The AN will hence only be described in brief in order to avoid unnecessary repetition.

Figure 8:
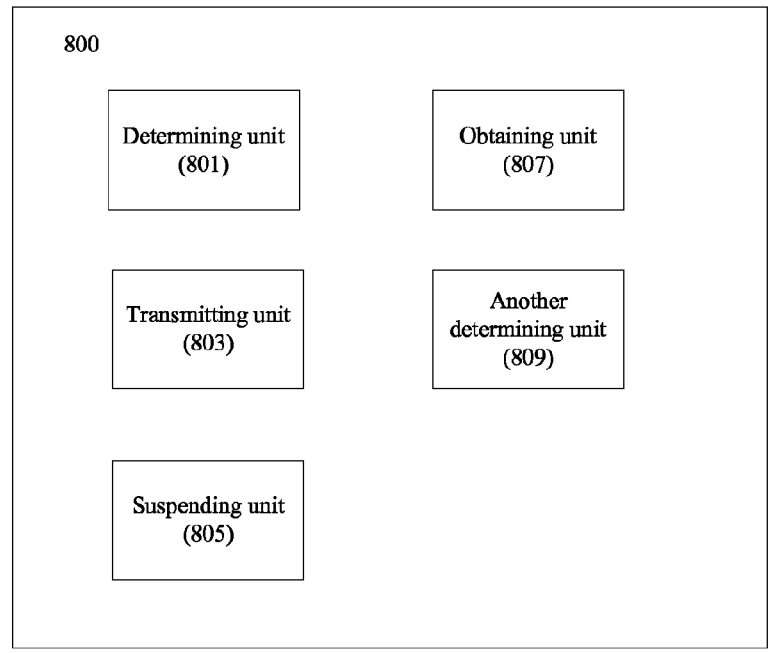
FIG. 8 is a block diagram of an AN according to an exemplifying embodiment.

FIG. 8 is a block diagram of an AN according to an exemplifying embodiment.

FIG. 8 illustrates the AN 800 comprising a determining unit 801 for determining information related to a series of measurement time gaps in response to receiving from a served user equipment a measurement request for measuring a neighbouring access node which is working at the same frequency as the user equipment; and a transmitting unit 803 for transmitting the information to the served user equipment.

In an embodiment, the AN further comprises a suspending unit 805 for after the transmitting step, suspending data communication with the served user equipment.

In an embodiment, the AN further comprises an obtaining unit 807 for before the determining step, obtaining the system signal of the neighbouring access node from the neighbouring access node, wherein the information is determined at least based on the system signal of the neighbouring access node.

In an embodiment, the information related to the series of measurement time gaps comprises a delay, a period of the series of measurement time gaps, length of each measurement time gap.

In an embodiment, the AN further comprises another determining unit 809 for determining information related to another series of measurement time gaps in response to receiving from the served user equipment the measurement request for measuring another neighbouring access node which is working at the same frequency as the user equipment, and the information related to the another series of measurement time gaps is included in the information related to the series of measurement time gaps.

The AN may have the same advantages as the method performed by the AN.

Furthermore, it should be noted that FIG. 8 merely illustrates various functional units in the AN 800 in a logical sense. The functions in practice may be implemented using any suitable software and hardware means/circuits etc. Thus, the embodiments are generally not limited to the shown structures of the AN 800 and the functional units.

In an embodiment, a UE according to the disclosure may comprise a computer program comprising instructions which, when executed on at least one processor, cause the at least one processor to carry out the above method performed by the UE; and a carrier comprising the computer program.

In an embodiment, an AN according to the disclosure may comprise a computer program comprising instructions which, when executed on at least one processor, cause the at least one processor to carry out the above method performed by the AN; and a carrier comprising the computer program.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A measuring method performed by a user equipment for which an analog beamforming scheme is applied, the method comprising:
transmitting, to a serving access node, a measurement request for measuring a neighbouring access node that is working at a same frequency as the user equipment;
receiving, from the serving access node, information related to a series of measurement time gaps; and
after a delay, performing a measurement to the neighbouring access node within the series of measurement time gaps, wherein within each of the series of measurement time gaps, the performing comprises:
suspending data communication with the serving access node,
adjusting a beamforming pattern of the user equipment, and
detecting a system signal of the neighbouring access node.

2. The measuring method according to claim 1, further comprising: after the detecting,
re-adjusting the beamforming pattern of the user equipment; and
restoring the data communication with the serving access node.

3. The measuring method according to claim 1, wherein the information comprises a length of the delay, a period of the series of measurement time gaps, and a length of each measurement time gap.

4. The measuring method according to claim 3, wherein the period of the series of measurement time gaps is a multiple of a period of a system signal of the neighbouring access node, and the length of each measurement time gap is equal to a sum of an offset and a length of a transmitting time gap within which the system signal of the neighbouring access node is transmitted.

5. The measuring method according to claim 1, further comprising: after another delay, performing measurement to another neighbouring access node within another series of measurement time gaps,
wherein the another neighbouring access node is working at the same frequency as the user equipment, and information related to the another series of measurement time gaps is included in the information related to the series of measurement time gaps.

6. The measuring method according to claim 5, wherein the delay is different from the another delay and the series of measurement time gaps do not overlap the another series of measurement time gaps.

7. A method performed by an access node, the method comprising:
determining information related to a series of measurement time gaps in response to receiving from a served user equipment a measurement request for measuring a neighbouring access node that is working at a same frequency as the user equipment; and
transmitting the information to the served user equipment, wherein the transmitting includes causing the served user equipment, to perform, after a delay, a measurement of the neighbouring access node within the series of measurement time gaps, and wherein causing the served user equipment to perform includes causing the served user equipment to:
suspend data communication with the access node,
adjust a beamforming pattern of the user equipment, and
detect a system signal of the neighbouring access node.

8. The method according to claim 7,
wherein the information related to the series of measurement time gaps is determined at least based on a system signal of the neighbouring access node.

9. The method according to claim 7, wherein the information comprises: a delay, a period of the series of measurement time gaps, and a length of each measurement time gap.

10. The method according to claim 7, further comprising:
determining information related to another series of measurement time gaps in response to receiving from the served user equipment a measurement request for measuring another neighbouring access node that is working at the same frequency as the user equipment, and the information related to the another series of measurement time gaps is included in the information related to the series of measurement time gaps.

11. The method according to claim 10, wherein the series of measurement time gaps do not overlap the another series of measurement time gaps.

12. The method according to claim 11, wherein
if a transmitting time gap of a system signal of the neighbouring access node does not overlap that of a system signal of the another neighbouring access node,
a delay corresponding to the neighbouring access node is different from that corresponding to the another neighbouring access node, and a period of the series of measurement time gaps is a multiple of a period of the system signal of the neighbouring access node, and a period of the another series of measurement time gaps is a multiple of a period of the system signal of the another neighbouring access node.

13. The method according to claim 11, wherein
if a transmitting time gap of a system signal of the neighbouring access node overlaps that of a system signal of the another neighbouring access node,
a delay corresponding to the neighbouring access node is different from that corresponding to the another neighbouring access node, and a period of the series of measurement time gaps is at least twice as long as a period of the system signal of the neighbouring access node, and a period of the another series of measurement time gaps is at least twice as long as a period of the system signal of the another neighbouring access node.

14. A user equipment for which an analog beamforming scheme is applied, the user equipment comprising:
a processor and a memory, the memory including instructions which when executed by the processor cause the user equipment to:
transmit, to a serving access node, a measurement request for measuring a neighbouring access node that is working at a same frequency as the user equipment;
receive, from the serving access node, information related to a series of measurement time gaps; and
after a delay, perform a measurement to the neighbouring access node within the series of measurement time gaps, wherein within each of the series of measurement time gaps, to perform the measurement includes:
to suspend data communication with the serving access node,
to adjust a beamforming pattern of the user equipment, and
to detect a system signal of the neighbouring access node.

15. The user equipment according to claim 14, wherein the memory includes further instructions, which when executed by the processor cause the user equipment to:
re-adjust the beamforming pattern of the user equipment; and
restore the data communication with the serving access node.

16. The user equipment according to claim 14, wherein the memory includes further instructions, which when executed by the processor cause the user equipment to:
after another delay, perform a measurement to another neighbouring access node within another series of measurement time gaps, wherein the another neighbouring access node is working at the same frequency as the user equipment, and information related to the another series of measurement time gaps is included in the information related to the series of measurement time gaps.

17. An access node comprising:
a processor and a memory, the memory including instructions which when executed by the processor cause the access node to:
determine information related to a series of measurement time gaps in response to receiving from a served user equipment a measurement request for measuring a neighbouring access node that is working at a same frequency as the user equipment; and
transmit the information to the served user equipment, wherein to transmit includes to cause the served user equipment, to perform, after a delay, a measurement of the neighbouring access node within the series of measurement time gaps, and wherein to cause the served user equipment to perform includes to cause the served user equipment to:
suspend data communication with the access node,
adjust a beamforming pattern of the user equipment, and
detect a system signal of the neighbouring access node.

18. The access node according to claim 17, wherein the information includes a delay, a period of the series of measurement time gaps, and a length of each measurement time gap.

19. The access node according to claim 17, wherein the memory includes further instructions, which when executed by the processor cause the access node to:
determine the information at least based on a system signal of the neighbouring access node.

20. The access node according to claim 17, wherein the memory includes further instructions, which when executed by the processor cause the access node to:
determine information related to another series of measurement time gaps in response to receiving from the served user equipment a measurement request for measuring another neighbouring access node that is working at the same frequency as the user equipment; and
transmit, to the served user equipment, the information related to the another series of measurement time gaps.

21. A user equipment for which an analog beamforming scheme is applied, the user equipment comprising:
a transmitting unit to transmit, to a serving access node, a measurement request for measuring a neighbouring access node that is working at a same frequency as the user equipment;
a receiving unit to receive, from the serving access node, information related to a series of measurement time gaps; and
a performing unit to perform, after a delay, a measurement to the neighbouring access node within the series of measurement time gaps, wherein within each of the series of measurement time gaps, to perform comprises to:
suspend data communication with the serving access node,
adjust a beamforming pattern of the user equipment, and
detect a system signal of the neighbouring access node.

22. An access node comprising:
a determining unit to determine information related to a series of measurement time gaps in response to receiving from a served user equipment a measurement request for measuring a neighbouring access node that is working at a same frequency as the user equipment; and
a transmitting unit to transmit the information to the served user equipment, wherein to transmit includes to cause the served user equipment, to perform, after a delay, a measurement of the neighbouring access node within the series of measurement time gaps, and wherein to cause the served user equipment to perform includes to cause the served user equipment to:
suspend data communication with the access node,
adjust a beamforming pattern of the user equipment, and
detect a system signal of the neighbouring access node.

* * * * *